United States Patent
Lembach et al.

(10) Patent No.: US 10,618,100 B2
(45) Date of Patent: Apr. 14, 2020

(54) METHOD OF FASTENING A RIVET ELEMENT AND CORRESPONDING FASTENING SYSTEM

(71) Applicant: PROFIL Verbindungstechnik GmbH & Co. KG, Friedrichsdorf (DE)

(72) Inventors: Andreas Lembach, Darmstadt (DE); Oliver Diehl, Bad Homburg v.d.H. (DE)

(73) Assignee: PROFIL Verbindungstechnik GmbH & Co. KG (DE)

( * ) Notice: Subject to any disclaimer, the term of this patent is extended or adjusted under 35 U.S.C. 154(b) by 741 days.

(21) Appl. No.: 15/162,854

(22) Filed: May 24, 2016

(65) Prior Publication Data
US 2016/0361755 A1    Dec. 15, 2016

(30) Foreign Application Priority Data
Jun. 11, 2015   (DE) .................. 10 2015 109 255

(51) Int. Cl.
*B21J 15/04*    (2006.01)
*B21J 15/36*    (2006.01)
*B23P 19/06*    (2006.01)

(52) U.S. Cl.
CPC ............ *B21J 15/046* (2013.01); *B21J 15/04* (2013.01); *B21J 15/36* (2013.01); *B23P 19/062* (2013.01)

(58) Field of Classification Search
CPC .......... B21J 15/046; B21J 15/04; B21J 15/36; B23P 19/062
See application file for complete search history.

(56) References Cited

U.S. PATENT DOCUMENTS 2,433,103 A    12/1947   Doyle

FOREIGN PATENT DOCUMENTS

DE         4239584 A1      5/1994
DE      102010033714 B3    10/2011

OTHER PUBLICATIONS

European Search Report dated Oct. 17, 2016 for European Patent Application No. 16169268.6-1702, 2 pages.
Extended German search report for related German application No. 102015109255.7, dated Jan. 1, 2016, pp. 2.

*Primary Examiner* — John C Hong
(74) *Attorney, Agent, or Firm* — Dickinson & Wright PLLC (57) ABSTRACT

The invention relates to a method of fastening a rivet element to a workpiece which has a preshaped hole provided for the reception of a rivet section of the rivet element and which is made planar at least in the region around the preshaped hole. Prior to the fastening process, the workpiece is positioned at a well-defined spacing from a contact surface of a die by means of at least one spacer which is fixedly connected to the die for the reshaping of the rivet section during the fastening process, so that a gap is formed between a wall of the hole and a punch of the die, which is provided for the reshaping of the rivet section. The rivet section is introduced into the gap in the course of the fastening process and is reshaped by the punch in order to engage behind the workpiece in the region of the hole.

18 Claims, 4 Drawing Sheets

METHOD OF FASTENING A RIVET ELEMENT AND CORRESPONDING FASTENING SYSTEM

The present invention relates to a method of fastening a rivet element to a workpiece which has a preshaped hole provided for the reception of a rivet section of the rivet element.

Such a method is generally known and typically includes the rivet section being introduced into the preshaped hole in the course of the fastening process and being reshaped such that the rivet section engages behind the workpiece and a shape-matched and also force-transmitting rivet connection is established between the rivet element and the workpiece. The rivet section is, for example, a hollow cylindrical section which is bent over and/or beaded over radially outwardly at one end in a known manner in order to establish the rivet connection. In the industrial use of this method, a fastening system comprising a setting head and a die is typically used. In this respect, the workpiece is first positioned at a support surface of the die so that the hole of the workpiece and a central punch of the die are aligned with one another. The rivet element is then moved, by means of the setting head, with its rivet section through the preshaped hole of the workpiece in the direction of the die and is pressed against the punch of the die in order to reshape the rivet section for establishing the rivet connection. The shape of the workpiece is changed into a flare in the region around the hole prior to the fastening of the rivet element so that the rivet section can engage behind the workpiece. A gap into which the rivet section is introduced thereby arises between the punch and the wall of the hole. This means that a sufficiently large space into which the rivet section can engage is provided between the workpiece and the die in this region. However, it is disadvantageous in this respect that the changing of the shape of the workpiece for the formation of the flare or boss which is necessary prior to the fastening may require a separate preprocessing step which has to be carried out in addition to the actual fastening of the rivet element.

Furthermore, the corresponding changing of the shape of the workpiece in the region around the hole—which can be disturbing for a variety of reasons—has to be adapted to the dimensions of the rivet section to be reshaped, e.g. to the thickness and length of the rivet section, so that the desired reshaping of the rivet section and the reliable engagement of the rivet bead behind the workpiece are also actually made possible.

It is therefore an object of the present invention to provide a method of the initially named kind in which the above-explained problems are avoided.

This object is satisfied by a method having the features of claim 1.

In accordance with the invention, prior to the fastening process, the workpiece is positioned at a well-defined spacing from a contact surface of a die by means of at least one spacer which is fixedly connected to the die for the reshaping of the rivet section during the fastening process, so that a gap is formed between a wall of the hole and a punch of the die, which is provided for the reshaping of the rivet section. The rivet section is introduced into the gap in the course of the fastening process and is reshaped by the punch in order to engage behind the workpiece in the region of the hole.

A substantial advantage of this solution is that the workpiece is held at a defined spacing from a contact surface of the die by means of the spacer, whereby a gap which is sufficiently large for the back side engagement of the rivet section when reshaped is precisely fixed and can in particular be reliably maintained during the fastening process. In this respect, the method in accordance with the invention is, for example, particularly suitable for differently dimensioned rivet elements and workpieces since the width of the gap required for the reshaping of the rivet section is fixed by the spacer and can be adapted in a correspondingly simple manner. The width of the gap can be identical to the spacing. It is, however, also possible that the contact surface is—as a rule only slightly—offset with respect to a reshaping surface of the punch of the die. In this case, the width of the gap differs from the spacing.

A further advantage of the method in accordance with the invention can be seen in the fact that the rivet element can be fastened directly to the prepunched workpiece and that no preprocessing steps are necessary. The workpiece can remain planar and a changing of the shape into a flare does not have to be provided in the region of the hole. Dispensing with the formation of a flare, at least prior to the attachment of the rivet element, is furthermore also advantageous to the extent that a flared deformation represents a projection which can be disturbing, e.g. on a positioning in a respective processing tool and/or on a removal of the workpiece from a respective processing tool. In this manner, e.g. a punching of the workpiece transversely to the demolding direction of the workpiece is also made possible—in particular with an angled tool—without a movement of the workpiece being impeded by a changing of the shape into a flare.

It is understood that the workpiece does not have to be made completely planar in the region around the hole in order to realize the advantages of the method in accordance with the invention. Slight changes of the shape of the workpiece in the region around the hole, which are for example caused by the formation of the hole, thus in particular do not present a problem for a successful carrying out of the method in accordance with the invention.

Further embodiments of the method in accordance with the invention are set forth in the description, in the claims and in the enclosed drawings.

In accordance with an embodiment, the spacer projects out of the contact surface of the die, with the section of the spacer which projects out of the contact surface defining the spacing between the workpiece and the contact surface of the die.

However, the spacing can generally also be defined with respect to other sections and surfaces of the die. The spacing can, for example, also be defined between the workpiece and a section of the punch of the die. In accordance with the invention, it is only important that the spacing between the workpiece and the die is of such a kind that a gap or an intermediate space is formed between the wall of the hole of the workpiece and the lower side of the workpiece, on the one hand, and the punch of the die or the die itself, on the other hand, in order to be able to reshape the rivet section such that said rivet section engages behind the workpiece in the region of the hole and a shape-matched and preferably also force-transmitting connection of the rivet element with the workpiece is thus established.

The method in accordance with the invention can be expanded in that the workpiece is moved toward the contact surface of the die from a specific point in time during the fastening process. A final pressing of the rivet section behind the workpiece can, for example, be effected hereby so that the lower side of the workpiece in the region of the hole is at least substantially made planar and/or smooth despite the engaging-behind rivet section. Furthermore, a force transmission between the rivet element and the workpiece can additionally be brought about by a pressing in of the engaging-behind rivet section. However, the spacing and the width of the gap/intermediate space formed between the workpiece and the punch are also reduced by a movement of the workpiece toward the contact surface. So that the advantage of the invention, of the gap which is sufficiently large for reshaping the rivet section, is nevertheless maintained, it has to be ensured that the workpiece is at least held at the defined spacing from the contact surface of the die until the rivet section has at least partly engaged into the gap and/or engaged behind the workpiece.

In accordance with an embodiment, it can be fixed that the workpiece is only moved toward the contact surface after an introduction of at least a part of the rivet section into the gap. It is hereby prevented that the gap is already reduced so much by a movement of the workpiece toward the contact surface that the rivet section is no longer able to engage into the gap. In other words, a reduction of the gap beyond the dimensions of the rivet section to be introduced is prevented in that the rivet section already engages into the gap prior to the movement of the workpiece.

In accordance with a further embodiment, the workpiece is only moved toward the contact surface after the start of a reshaping of the rivet section. It can hereby be ensured that the workpiece is only moved when the rivet section is already being pressed against the punch of the die with a sufficiently large force and a reshaping of the rivet section has hereby already been set in motion. In this respect, the rivet section does not yet necessarily have to engage into the gap. For example, the gap can be larger prior to the start of the movement of the workpiece than would have actually been necessary for an engagement of the rivet section. A reshaping of the rivet section can thus take place simultaneously with the movement of the workpiece, wherein the rivet section is naturally still introduced into the gap in good time before the available gap/intermediate space has become too small.

In contrast to this, the workpiece can also only be moved toward the contact surface after the completion of the reshaping of the rivet section. In other words, the time of the start of the workpiece movement can be selected such that the reshaping of the rivet section is at least substantially completed and the rivet section already significantly engages around, i.e. engages behind, the workpiece. An unwanted impediment to the reshaping of the rivet section by the workpiece can thus be precluded.

In accordance with a preferred embodiment, the workpiece is at least moved in that an abutment portion of the rivet element, in particular a flange portion of the rivet element, comes into contact with a side of the workpiece remote from the die and the workpiece is hereby moved in the direction toward the contact surface in the course of a further movement of the rivet element. Alternatively or additionally, a setting head which introduces the rivet element and by means of which the rivet element is moved in the direction of the die can effect a movement of the workpiece toward the contact surface. However, the workpiece does not necessarily have to be moved actively. For example, a movement of the workpiece toward the contact surface can also be implemented as a relative movement in that the die is moved toward the workpiece.

In accordance with a further embodiment, the shape of the workpiece is locally changed by the spacer on the movement toward the contact surface. Since the spacer is fixedly connected to the die during the fastening process in accordance with the invention, the workpiece at least has to be deformed in the region of the spacer on the movement such that this movement is made possible at all, since the spacer is in particular formed from a more solid material than the workpiece so that the shape of the spacer is not changed by the workpiece. The spacer is preferably formed from a high-strength material such as steel, titanium or the like.

In order to keep a change of the shape of the workpiece as small as possible, the spacer is made in the manner of a pin, for example. Furthermore, the spacer can have a convex or rounded support surface which faces the workpiece at an end section. On the one hand, the local change of the shape of the workpiece is hereby limited on a movement of the workpiece toward the contact surface and, on the other hand, the risk of damage to the workpiece by the spacer is reduced. An injury of a part of the workpiece surface or damage to a protective coating of the workpiece can thus, for example, be prevented. A further advantage of a convex support surface is that the force required for the movement of the workpiece is comparatively small due to the relatively small change of the shape.

Preferably a plurality of spacers, in particular three spacers, are in particular provided on a pin-like configuration of the spacer in order to hold the workpiece, in particular along the total region of the workpiece adjacent to the hole, at the defined spacing and to ensure a sufficiently large gap. A plurality of spacers are additionally advantageous in order to be able to support or position the workpiece at the die in a stable manner. In this connection, a convex support surface of the respective spacers moreover has the advantage of respective approximately point-like supports for the workpiece, i.e. the contact surface between the workpiece and each spacer is minimized. The convex support surface thus contributes to a defined and reliable support of the workpiece. In principle, other configurations of the spacer are also conceivable. The spacer can thus be made ring-shaped or part-ring-shaped, for example.

In accordance with a further embodiment, the workpiece is pressed, at least in the region of the rivet section engaging behind it, at least partly into a receiving recess which is formed at an abutment portion of the rivet element. The receiving recess can, for example, be a circularly extending groove of ring shape which extends between the abutment portion and the rivet section. The abutment portion is in particular formed as a flange portion of the rivet element. The above-explained movement of the workpiece toward the contact surface can therefore in particular be effected in that the flange portion of the rivet element abuts the workpiece and the workpiece is hereby inevitably moved along on a further movement of the rivet element in the direction toward the die.

The receiving recess of the rivet element can have a plurality of functions. A margin of the hole can thus, for example, be pressed into the receiving recess and can be received at least in part in the receiving recess. The rivet element can hereby be fixed better to the workpiece. Furthermore, the receiving recess also allows a changing of the shape of the wall of the workpiece which bounds the hole in a direction away from the rivet section which engages behind the workpiece. A reception space for the rivet section is hereby provided at a side of the workpiece which is remote from the receiving recess of the rivet element, i.e. at the lower side of the workpiece, so that the rivet section can be recessed into the workpiece in the region of the rear engagement in order to obtain a planar lower side of the workpiece. In other words, the rivet section can be pressed from below against the workpiece in the region of the hole wall, said workpiece in turn deflecting into the receiving recess so that the rivet section does not project from the workpiece after the fastening of the rivet element.

The receiving recess can have one or more ribs which extend transversely to the extent of the receiving recess in the radial direction. A security against rotation can hereby be realized in that the rib or ribs is/are pressed into the workpiece when the workpiece is pressed into the receiving recess. An unwanted rotation of the rivet element relative to the workpiece can thus be counteracted.

The invention furthermore relates to a fastening system for fastening a rivet element to a workpiece, preferably to a sheet metal part, in particular in accordance with one of the above-described embodiments of the method in accordance with the invention, wherein the workpiece has a preshaped hole provided for the reception of a rivet section of the rivet element, wherein the workpiece is made planar at least in the region around the preshaped hole. The fastening system includes a die which has at least one spacer which is fixedly connected to the die during the fastening process in order to position the workpiece at a well-defined spacing from a contact surface of the die during the fastening process, so that a gap is formed between a wall of the hole and a punch of the die, which is provided for the reshaping of the rivet section. The fastening system furthermore includes a setting head for the introduction of the rivet element into the workpiece, wherein the rivet element is receivable at least in part in the setting head.

In accordance with a preferred embodiment, the punch projects out of the contact surface of the die and has a reshaping surface by which the rivet section can be reshaped radially outwardly at least section-wise. The rivet section can in particular be reshaped by the reshaping surface in the direction of the gap. For this purpose, the reshaping surface of the punch is preferably conically and/or concavely shaped at least section-wise. The reshaping surface can transition continuously or offset by one or more stages into the contact surface of the die.

Furthermore, a recess can be provided between the contact surface and the punch. A rivet section, in particular a thick-walled rivet section, can hereby, for example, be reshaped such that it can no longer be pressed completely into the workpiece when the workpiece is moved toward the contact surface.

In accordance with a further preferred embodiment, the setting head has a workpiece contact surface having at least one cavity which is at least substantially aligned with the spacer of the die in a direction of a fastening movement of the rivet element. The cavity of the setting head which is aligned with the spacer is in particular advantageous when the workpiece is moved in the direction toward the contact surface during the fastening process and the local change of the shape of the workpiece in the region of the spacer, which is explained above in connection with the method in accordance with the invention, is hereby brought about. The cavity can ensure that the change of the shape at the side which is remote from the die is restricted and/or that the change of the shape is (co-)defined by a shape of the cavity. The cavity can thus represent an "auxiliary die" in order to influence the change of the shape of the workpiece, which is caused by the spacer of the "main die", in a desired manner. The workpiece contact surface which surrounds the cavity moreover contributes thereto that the shape of the workpiece at the side remote from the (main) die is only changed in the region of the cavity and that no further unwanted deformations of the workpiece occur during the fastening process.

The workpiece contact surface of the setting head can furthermore lie in a plane with a workpiece contact surface of the rivet element when the rivet element is inserted into the setting head. This surface is in particular formed at a flange portion of the rivet element. The workpiece contact surface of the rivet element can, for example, form a common workpiece contact surface together with the workpiece contact surface of the setting head, with the workpiece contacting said common workpiece contact surface when the workpiece is moved in the direction of the contact surface toward the die. Such a common enlarged workpiece contact surface has the advantage that the force exerted onto the workpiece is distributed onto a larger surface and a local overloading of the workpiece as well as hereby impending damages or deformations at the workpiece are avoided.

The spacer of the matrix is preferably releasably connected to the die. It can be adjustable with respect to its position. The position can be adjusted in the plane of the contact surface and/or with respect to the length of a section of the spacer projecting out of the contact surface, for example. The well-defined spacing can hereby in particular be set as required. The position of the spacer can additionally be adapted to the requirements of the workpiece to be supported. The spacer can also be formed integrally with the die (one-piece formation), in particular when an adjustability of its position can be dispensed with.

Furthermore, the spacer is preferably arranged radially spaced apart from the punch. It is hereby ensured that the rivet section can completely engage into the gap/intermediate space and is not, for instance, impeded by the spacer. The radial spacing from the punch can in particular be selected such that the rivet section can completely engage behind the workpiece in the region of the hole.

In accordance with a preferred embodiment, a plurality of spacers, in particular three spacers, are arranged symmetrically around the punch of the die. The spacers can, for example, be arranged on a circular path around the punch. In accordance with a particularly preferred embodiment, three spacers made in the manner of pins are arranged in an equidistant manner around the punch. An advantageous three-point support of the workpiece can hereby be realized. As already mentioned, the respective end sections of the spacers which face the workpiece can be shaped convexly/roundly in order to ensure a mechanically favorable, approximately point-like support of the workpiece, on the one hand, and, on the other hand, to permit a penetration of the end sections into the workpiece which requires as little force as possible when the workpiece is moved in the direction toward the contact surface.

It is understood that features mentioned within the framework of the description of the method in accordance with the invention can equally be applied to the described fastening system and vice versa. All the embodiments of the fastening system described here are thus in particular configured to be operated in accordance with one or more of the embodiments of the method in accordance with the invention described here. Furthermore, the described embodiments of the fastening system as well as the described embodiments of the method can respectively be combined with one another.

The present invention will be described in the following purely by way of example with reference to an advantageous embodiment of the invention and to the enclosed drawings. There are shown.

Figure 1A:
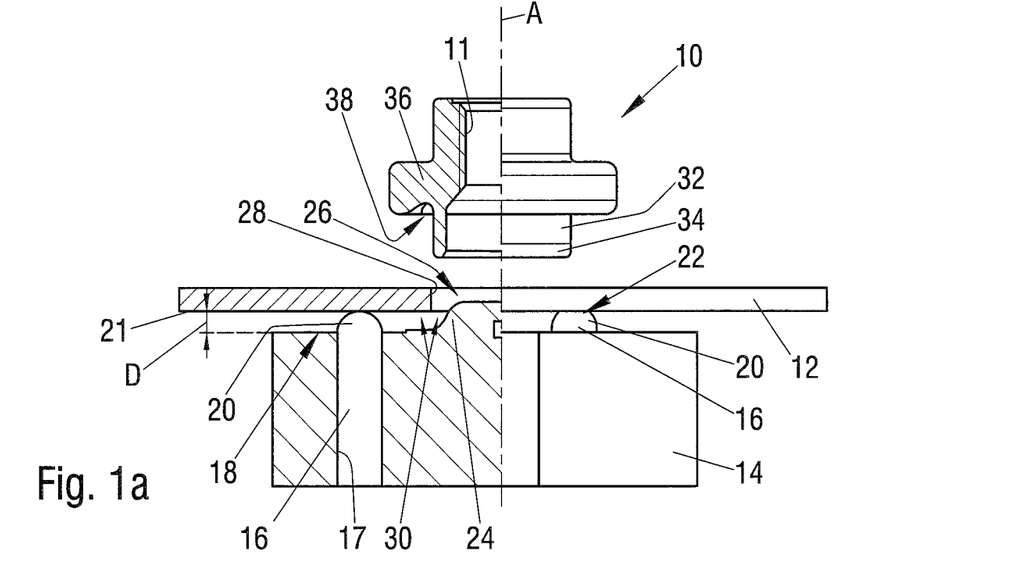
FIGS. 1a to 1c an embodiment of the method in accordance with the invention of fastening a rivet element to a sheet metal part.
Figure 1B:
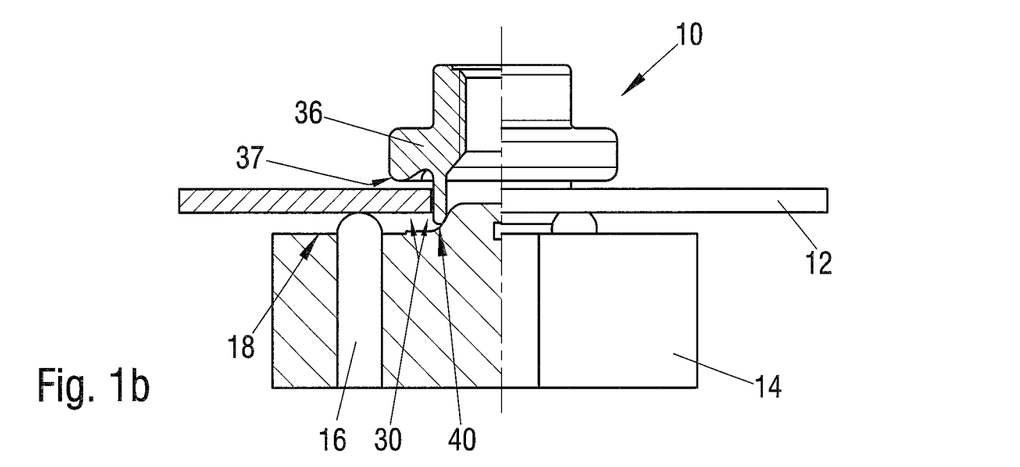
Figure 1C:
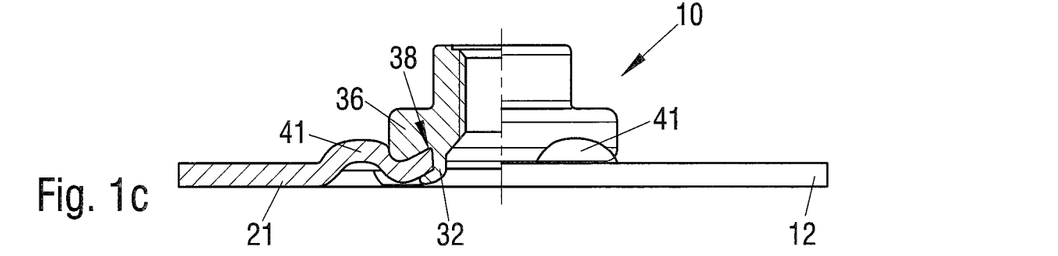

FIG. 1 shows three different states during a fastening of a rotationally symmetrically configured rivet element 10 with an internal thread 11 at a sheet metal part 12. It is understood that rivet elements of a different design can also be used instead of the rivet element 10 and that they do not necessarily have to be configured rotationally symmetrically. Rivet elements having a pin section—with or without a thread—are also conceivable.

FIG. 1a shows a starting situation prior to the fastening process, wherein the rivet element 10 is arranged above the sheet metal part 12 in FIG. 1a. A die 14 is present at the oppositely disposed side of the sheet metal part 12. The sheet metal part 12 is supported on spacers 16 which are fixedly connected to the die 14. This means that the spacers 16 do not move in the course of the fastening process.

The arrangement of FIG. 1a is divided in two into a cross-sectional view at the left hand side and a side view at the right hand side. The boundary between the two views extends through an axis of symmetry A which relates to both the rotationally symmetrically configured rivet element 10, the sheet metal part 12—at least in a region around the fastening point—and the die 14, as will be explained in more detail further below.

The spacers 16 extend in parallel with the axis A, wherein the spacers are screwed into corresponding bores 17 of the die 14 and are therefore releasably connected thereto. The spacers 16 are each made in the manner of pins and have an end section 20 which projects out of a contact surface 18 of the die 14. The length of the end sections 20 is set uniformly such that the sheet metal part 12 is horizontally supported on the spacers 16, i.e. perpendicular to the axis A. A spacing D is thereby set between a lower side 21 of the sheet metal part 12—i.e. between the side of the sheet metal part 12 facing the contact surface 18—and the contact surface 18. Each end section 20 includes a substantially convex support surface 22 which faces the sheet metal part 12.

If required, the spacing D can be adapted by an adjustment of the spacers 16, e.g. if a different rivet element 10 should be used.

The die 14 has a conical punch 24 which projects in part into a circular hole 26 provided at the sheet metal part 12. The axis A extends through the corresponding centers of the punch 24 and of the hole 26. In this respect, the axis A is thus an axis of symmetry for the sheet metal part 12—at least in the region around the hole 26—and for the die 14. The hole 26 was produced prior to the fastening process described here.

The sheet metal part 12 is made planar in the region around the hole 26 and does not have a flare in this region. Optionally, however, the sheet metal part 12 can also be made completely planar—as in the embodiment described here. However, this does not necessarily have to be the case.

A gap 30 is formed between a wall 28 of the hole 26 of the sheet metal part 12 and the lower side 21 of the sheet metal part 12, on the one hand, and the punch 24, on the other hand.

The rivet element 10 arranged above the sheet metal part 12 has a rivet section 32 which extends away from a flange portion 36 of the rivet element 10 in the axial direction and which has an end edge 34 which is rounded at the outside and conical at the inside. A functional section which supports the thread 11 at least in part is provided at the other side of the flange portions 36. The rivet element 10 is a nut element.

A peripheral groove 38 is provided in a transition region between the flange portion 36 and the rivet section 32.

The outer diameter of the rivet section 32 is slightly smaller than the diameter of the hole 26 so that the rivet section 32 can be introduced into the hole 26.

Starting from the state shown in FIG. 1a, the rivet element 10 is now moved in the axial direction in the direction toward the die 14, wherein the rivet section 32 is aligned with the hole 26 of the sheet metal part 12 (coaxial alignment).

FIG. 1b shows the arrangement of FIG. 1a in a second state in which the rivet section 32 is introduced into the hole 26. On a further movement of the rivet element 10 in the direction toward the die 14, the inwardly disposed part of the end edge 34 of the rivet section 32 acts together with a concavely configured reshaping surface 40 of the punch 24 and the rivet section 32 is reshaped radially outwardly so that the rivet section 32 engages into the gap 30 and engages behind the sheet metal part 12.

The rivet element 10 is displaced further in the direction toward the die 14 during the reshaping of the rivet section 32, wherein the flange portion 36 comes into contact with a contact surface 37 at the sheet metal part 12. The length of the rivet section 32, i.e. the spacing D, is adapted such that the flange portion 36 only comes into contact with the sheet metal part 12 when the rivet section 32 at least partly engages behind the sheet metal part 12 in the course of the reshaping, in particular when the reshaping which causes the rivet section to engage behind the workpiece is completed.

The rivet element 10 is now moved further in the direction toward the die 14, wherein the sheet metal part 12 is moved along in the direction toward the contact surface 18 of the die 14. In this respect, the shape of the sheet metal part 12 is changed locally in the region of the spacers 16 so that the end sections 20 of the spacers 16 engage into the sheet metal part 12 and the sheet metal part 12 comes into contact with the contact surface 18. In this connection, the end sections 20 of the spacers 16 which change the shape of the sheet metal part 12 cause a respective elevated portion 41 of the sheet metal part 12 at the side remote from the die 14, as will be explained in more detail further below.

In FIG. 1c the sheet metal part 12 is shown with the rivet element 10 after the completion of the fastening process. It can be seen that the shape of the sheet metal part 12 is changed in the region of the rivet section 32 which engages behind it during its movement from the position shown in FIG. 1b in the direction toward the die 14. In this respect, the region of the sheet metal part 12 which is originally adjacent to the hole 26 deflects due to a cooperation with the rivet section 32 which engages behind the sheet metal part 12 and is pressed into the groove 38 of the rivet element 10. At the same time, the engaging-behind rivet section 32 is completely displaced into the plane of the sheet metal part 12 which extends perpendicular to the axis A by a cooperation with the reshaping surface 40 of the punch 24 so that the lower side 21 of the sheet metal part 12 which faces the die 14 is substantially made planar. This means that the reshaped rivet section 32 does not project out of the plane of the lower side 21. In addition, the rivet section 32 is deformed in part such that the rivet section 32 nestles against the sheet metal part 12. A particularly good shape matching and force transmission between the rivet element 10 and the sheet metal part 12 are hereby achieved. As mentioned above, the end sections 20 of the spacers 16 engage into the sheet metal part 12 in the course of the movement of the sheet metal part 12 toward the contact surface 18 of the die 14. As a result, the already mentioned elevated portions 41 are thereby produced at the upper side of the sheet metal part 12 (FIG. 1c).

Figure 2A:
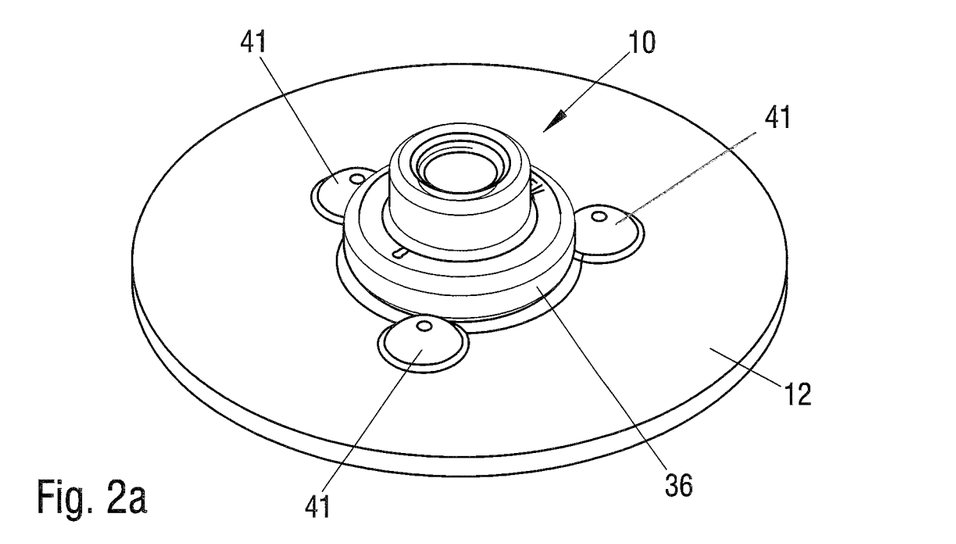
FIGS. 2a and 2b two perspective views of a sheet metal part to which a rivet element has been fastened using the method in accordance with FIG. 1.
Figure 2B:
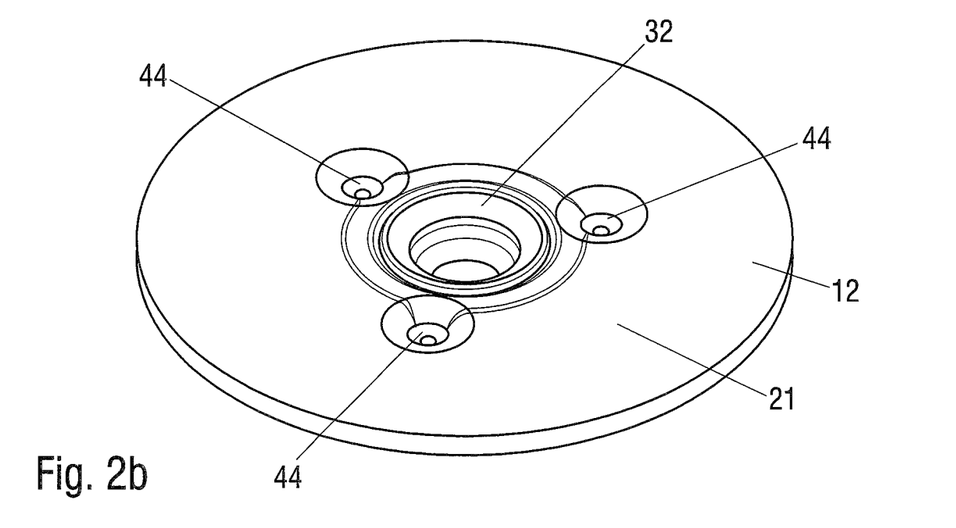

FIG. 2a shows the sheet metal part 12 of FIG. 1c with the fastened rivet element 10 in a perspective view obliquely from above. The elevated portions 41 can be recognized particularly easily here. Three elevated portions 41 are arranged distributed symmetrically around the flange portion 36 of the rivet element 10. In FIG. 2b the sheet metal part 12 of FIG. 2a is shown with respect to its lower side 21 which faces the die 14 during the fastening process. The rivet section 32 is lowered into the sheet metal part 12 and does not project from the sheet metal part 12. Furthermore, recesses 44 produced by the end sections 20 are present at the lower side of the sheet metal part 12 and correspond to the respective elevated portions 41 at the upper side of the sheet metal part 12.

Figure 3:
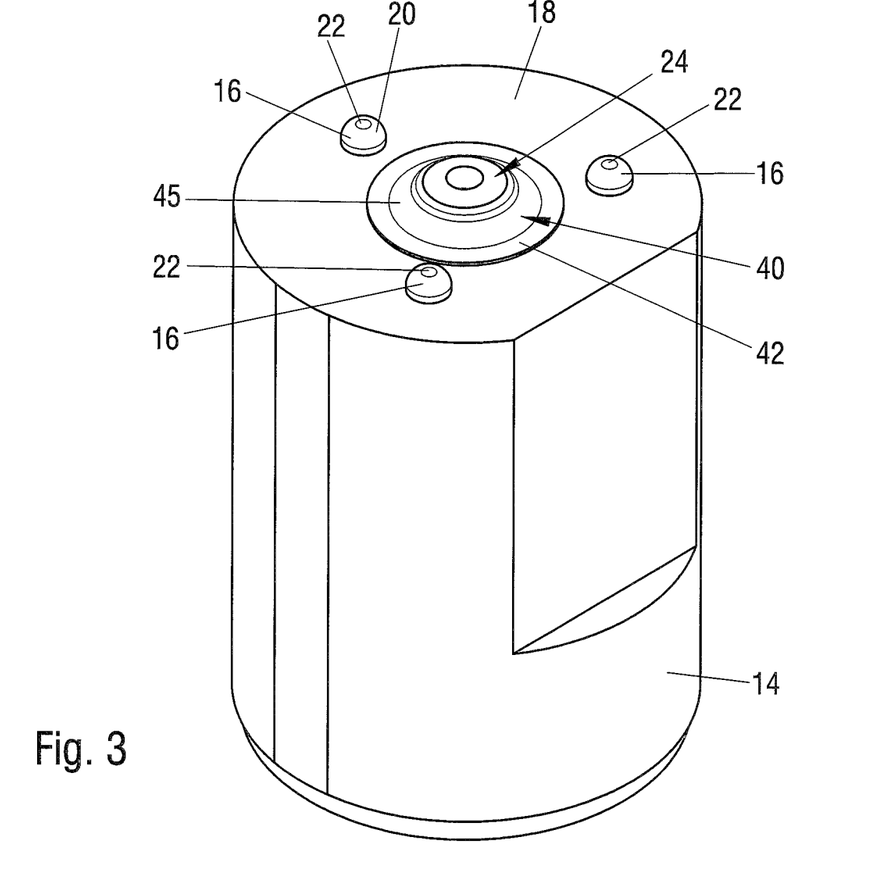
FIG. 3 a perspective view of a die for the carrying out of the method in accordance with FIG. 1.

FIG. 3 shows a perspective view of the die 14 of FIG. 1. The die 14 has three spacers 16 which are arranged symmetrically around the punch 24, whose respective end sections 20 project out of the contact surface 18 of the die 14. The spacers 16 are each arranged radially spaced apart from the punch 24.

The reshaping surface 40 includes an outer run-out section 42 which transitions into a concavely arched inner reshaping section 45. The contact surface 18 is offset with respect to the run-out section 42 of the punch 24 in the axial direction (FIG. 1a, FIG. 1b and FIG. 3). It is hereby reliably achieved that the engaging-behind rivet section 32 is completely displaced into the plane of the sheet metal part 12 after the fastening of the rivet element 10 so that the lower side 21 of the sheet metal part 12 forms a planar contact surface.

Figure 4:
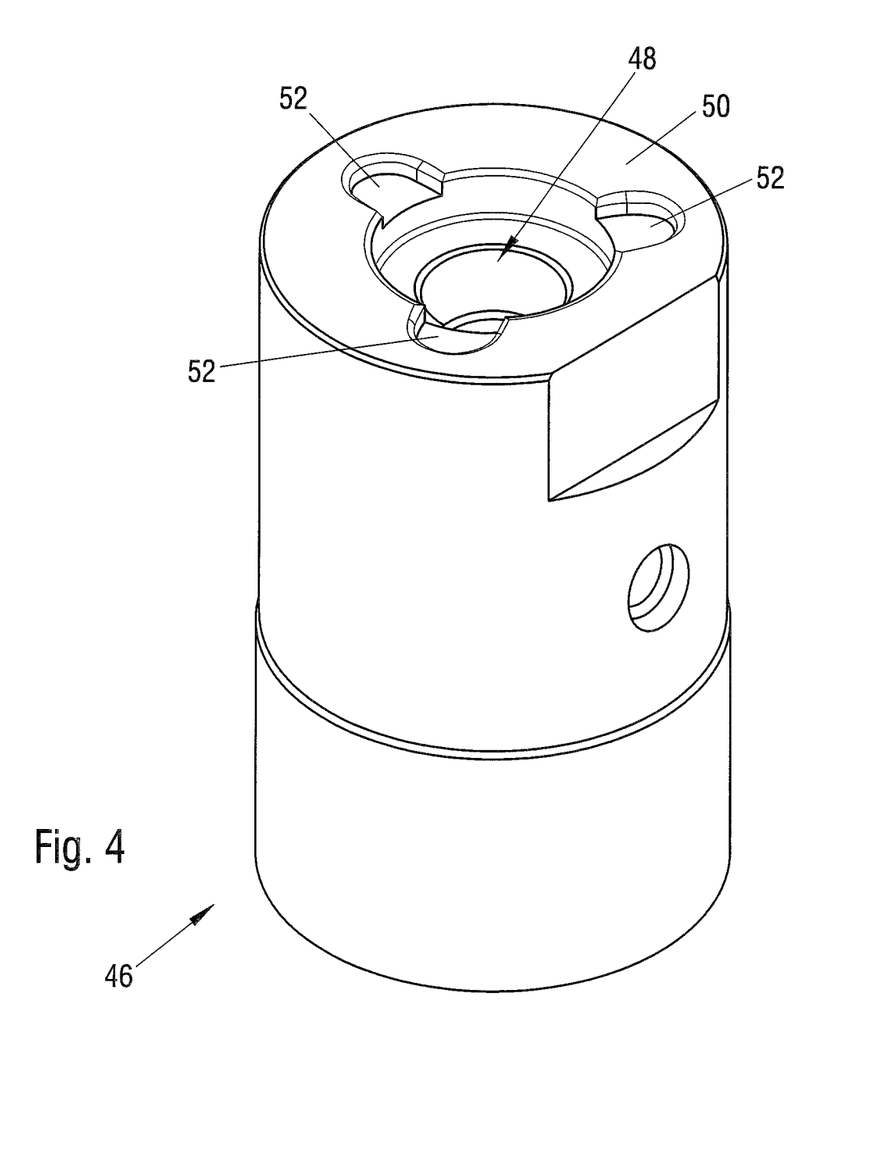
FIG. 4 a perspective view of a setting head for the carrying out of the method in accordance with FIG. 1.

FIG. 4 shows a perspective view of a setting head 46 by which the rivet element 10, starting from the position shown in FIG. 1a, can be moved in the direction toward the die 14 and can be fastened to the sheet metal part 12. The setting head 46 has a reception chamber 48 which is formed in a complementary manner to the rivet element 10 so that the rivet element 10 can be received, i.e. can be inserted, into the reception chamber 48. The reception chamber 48 is dimensioned such that only the rivet section 32 projects out of a contact surface 50 of the setting head 46 with an inserted rivet element 10. The flange portion 36, i.e. its contact surface 37, thus forms a common contact surface for the sheet metal part 12 together with the contact surface 50 of the setting head 46.

The setting head 46 furthermore has three cavities 52 which are provided symmetrically around the reception chamber 48. The symmetrical arrangement of the cavities 52 around the reception chamber 48 is complementary to the symmetrical arrangement of the spacers 16 around the punch 24 so that the cavities 52 are aligned with the spacers 16 when the rivet element 10 is inserted into the reception chamber 48 of the setting head 46 and is fastened to the sheet metal part 12 by a movement of the setting head 46 toward the die 14. The cavities 52 bound the periphery of the elevated portions 41 at the upper side of the sheet metal part 12 during the fastening of the rivet element 10.

REFERENCE NUMERAL LIST 10 rivet element
11 internal thread
12 sheet metal part
14 die
16 spacer
17 bore
18 contact surface
20 end section
21 lower side of the sheet metal part
22 support surface
24 punch
26 hole
28 wall
30 gap
32 rivet section
34 end edge
36 flange portion
37 contact surface
38 groove
40 reshaping surface
41 elevated portion
42 run-out section
44 recess
45 reshaping section
46 setting head
48 reception chamber
50 contact surface
52 cavity
A axis of symmetry
D spacing

The invention claimed is:

1. A method of fastening a rivet element to a workpiece which has a preshaped hole provided for reception of a rivet section of the rivet element and which is made planar at least in a region around the preshaped hole; and
    prior to beginning a fastening process, the workpiece being positioned at a defined spacing (D) from a die contact surface of a die by at least one spacer, the workpiece being moved toward the die contact surface by at least one of a flange portion of the rivet element and a setting head which introduces the rivet element, the at least one spacer being fixedly connected to the die for a reshaping of the rivet section during the fastening process so that a gap is formed between a wall defining the preshaped hole and a punch of the die, which is provided for the reshaping of the rivet section, the rivet section being introduced into the gap during the fastening process and being reshaped by the punch in order to engage behind the workpiece in the region around the preshaped hole.

2. The method of claim 1, the at least one spacer projecting out of the die contact surface and a section of the at least one spacer projecting out of the die contact surface defining the spacing (D).

3. The method of claim 1, the workpiece only being moved toward the die contact surface after an introduction of at least a part of the rivet section into the gap.

4. The method of claim 1, the workpiece only being moved toward the die contact surface after a start of the reshaping of the rivet section.

5. The method of claim 1, the workpiece only being moved toward the die contact surface after a completion of the reshaping of the rivet section.

6. The method of claim 1, the workpiece being moved toward the die contact surface by the flange portion of the rivet element.

7. The method of claim 1, a shape of the workpiece being locally changed by the at least one spacer on a movement toward the die contact surface.

8. The method of claim 1, the workpiece being pressed, at least in another region of the rivet section engaging behind the workpiece, at least partly into a receiving recess.

9. The method of claim 8, the receiving recess being a groove which is formed at the flange portion of the rivet element.

10. A method of fastening a rivet element to a workpiece comprising:

the rivet element being received in a reception chamber of a setting head during a fastening process, the reception chamber being formed in a complementary manner to the rivet element with the setting head having a setting head contact surface having at least one cavity which is at least substantially aligned with at least one spacer of a die in a direction of a fastening movement of the rivet element so that the workpiece is pressed section-wise into the at least one cavity during the fastening process, the workpiece defining a preshaped hole provided for reception of a rivet section of the rivet element and which is made planar at least in a region around the preshaped hole; and prior to the fastening process, the workpiece being positioned at a defined spacing (D) from a die contact surface by the at least one spacer, the at least one spacer being fixedly connected to the die for a reshaping of the rivet section during the fastening process so that a gap is formed between a wall defining the preshaped hole and a punch of the die which is provided for the reshaping of the rivet section, the rivet section being introduced into the gap during the fastening process and being reshaped by the punch in order to engage behind the workpiece in the region around the preshaped hole.

11. The method of claim 10, the at least one spacer projecting out of the die contact surface, with a section of the at least one spacer which projects out of the die contact surface defining the spacing (D).

12. The method of claim 10, the workpiece only being moved toward the die contact surface after an introduction of at least a part of the rivet section into the gap.

13. The method of claim 10, the workpiece only being moved toward the die contact surface after a start of the reshaping of the rivet section.

14. The method of claim 10, the workpiece only being moved toward the die contact surface after a completion of the reshaping of the rivet section.

15. The method of claim 10, the workpiece being moved toward the die contact surface by a flange portion of the rivet element.

16. The method of claim 10, a shape of the workpiece being locally changed by the at least one spacer on a movement toward the die contact surface.

17. The method of claim 10, the workpiece being pressed, at least in another region of the rivet section engaging behind the workpiece, at least partly into a receiving recess.

18. The method of claim 17, the receiving recess being a groove which is formed at a flange portion of the rivet element.

* * * * *